United States Patent [19]
Woodhams

[11] 3,922,675
[45] Nov. 25, 1975

[54] MOVING TARGET DETECTION RADAR SYSTEM

[75] Inventor: Ronald Alfred Woodhams, Malvern, England

[73] Assignee: Ministry of Aviation, London, England

[22] Filed: Nov. 13, 1962

[21] Appl. No.: 237,393

[30] Foreign Application Priority Data
Nov. 14, 1961 United Kingdom............... 40776/61

[52] U.S. Cl.................................. 343/7.7; 343/9
[51] Int. Cl.²....................................... G01S 9/42
[58] Field of Search .............. 343/7.7, 8, 9, 13

[56] References Cited
UNITED STATES PATENTS
3,614,785   10/1971   Kratzer................................ 343/7.7

Primary Examiner—T. H. Tubbesing
Attorney, Agent, or Firm—Larson, Taylor and Hinds

[57] ABSTRACT

A radar system comprises means for transmitting pulse signals and for receiving signals reflected from targets, a plurality of range gates each for gating a received signal corresponding to a different range, a plurality of modulation detecting means each controlled from a different range gate for detecting the modulation of signals received from a moving target and displaying the detected signal as modulations of a light source, and viewing means including a rotatable prism for viewing the light sources to give linearly displaced images thereof visible on a screen, whereby a moving target and the number of modulations of the source along the displacement line indicates the frequency and hence the rate of radial movement of the target.

5 Claims, 2 Drawing Figures

MOVING TARGET DETECTION RADAR SYSTEM

This invention relates to radar systems and has reference to systems for the detection of moving targets.

For some purposes, for instance forward area surveillance, light, easily-carried radar systems are required and it has been found that a pulse-radar system in which provision is made for detecting the amplitude modulation of pulses due to target movement, is very suitable.

A radar system then is required which can be made to withstand severe physical conditions. It should, moreover, provide for rapid location of targets at any selected range and enable an operator to identify targets by reference to the character of the modulation they cause.

It is an object of the invention therefore to provide an improved radar display system.

According to the invention a radar system comprises means for transmitting pulse signals and for receiving signals reflected from targets, a plurality of range gates each for gating a received signal corresponding to a different range, a plurality of modulation detecting means each controlled from a different range gate for detecting the modulation of signals received from a moving target and displaying the detected signal as modulations of a light source, and viewing means for viewing the light sources to give linearly displaced images thereof, whereby a moving target is displayed by that light source which corresponds to the range of the target and the number of modulations of the source along the displacement line indicates the frequency and hence the rate of radial movement of the target.

In order to make the invention clearer a light surveillance radar system embodying the invention will now be described by way of example reference being made to the drawings accompanying this Specification in which.

Figure 1:
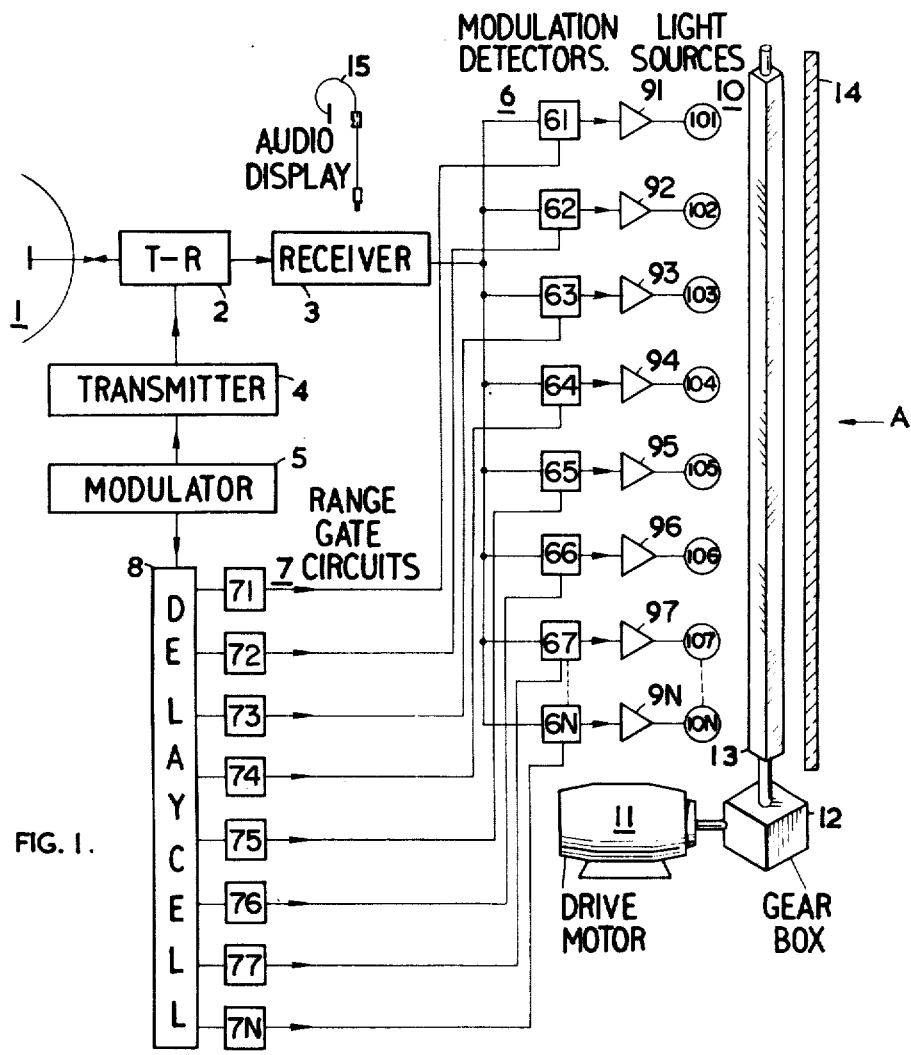
FIG. 1 shows schematically a block diagram of a surveillance radar system.

An aerial 1 of a radar system is connected via a T-R unit 2 to a receiver 3 and a transmitter 4. The transmitter 4 is controlled by a pulse modulator 5.

The receiver 3 feeds its video output to a number N of modulation detectors 61, 62, 63, 64, 65, 66, 67, . . ., 6N each of which is controlled by a corresponding range gate circuit 71, 72, 73, 74, 75, 76, 77, . . . , 7N. The modulator 5 feeds into a delay cell 8 and delayed pulse outputs in order of increasing delay are connected individually to corresponding range gate circuits 71 to 7N.

The modulation detectors 61 to 6N feed via modulation frequency amplifiers 91, 92, 93, 94, 95, 96, 97, . . ., 9N to individual range displays consisting of modulated light sources 101, 102, 103, 104, 105, 106, 107, . . ., 10N. Each light source displays a range determined by its corresponding range gate circuit 71 to 7N.

A drive motor 11 drives through a gear box 12, a rotating glass square section prism 13 which is located so that its axis of rotation is parallel with the row of light sources 101 to 10N. A rectangular glass screen 14 is placed in position for viewing the light sources 101 to 10N in the direction of the arrow A. A hood, not shown for reasons of simplicity and clarity, screens the light sources 101 to 10N, a long slot being provided in the hood opposite the prism 13.

A typical system specification is as follows:

| | |
|---|---|
| Operating Frequency | X band (3 cm) |
| Solid Beamwidth | 5 degrees between 3 dB points |
| Peak Transmitter Power | 1½ Kw |
| Pulse Length | 0.25 u secs |
| Pulse Repetition Frequency | 4,000 pulses/sec. |
| Super-heterodyne Receiver | |

The range gate circuits 71 to 7N are arranged to cover a 1,000 meter range band the position of the band in the overall range (0–6,000 meters) being determined by the timing of range pulses derived from the modulator 5. Each 1,000 meter range band is made up of discrete range points the number of which corresponds to the number N of range gate circuits 7. Each circuit 71 to 7N covers a range sub-band corresponding to one pulse length of the transmitter 4 giving an achievable accuracy of ± one pulse length ($N = 25$).

In operation the aerial 1 is directed to transmit towards a desired target area and reflected signals received at the receiver 3 are passed as video signals to the modulation detectors 61 to 6N. Here modulation signals are detected and selected according to range under the control of the associated gate circuit 71 to 7N and passed via the amplifier 91 to 9N to modulate the light sources 101 to 10N.

The light sources 101 to 10N are viewed by an observer looking in the direction of the arrow A through the rectangular screen 14 and the rotating prism 13.

Figure 2:
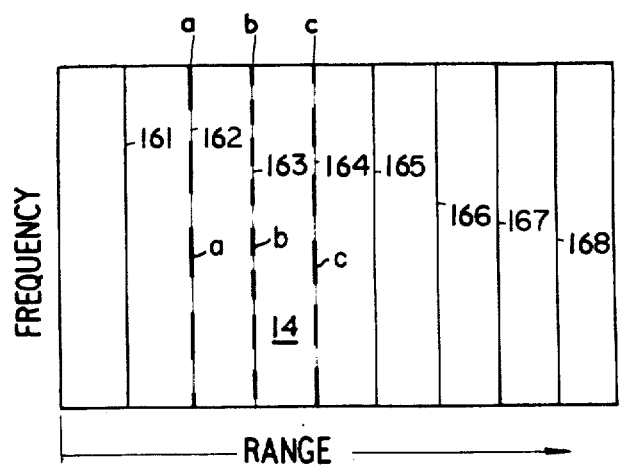
FIG. 2 shows a typical display.

Thus, a modulation signal derived from a reflected signal from a target at a given range will modulate the light source which corresponds to that range. An observer in front of the screen 14 sees the modulated light source and, owing to the rotating prism 13, sees it as a series of linearly displaced images extending at right angles to the axis of the prism. FIG. 2 shows a display of the type seen on the screen 14. The linear displacement paths of images of the light sources are indicated by lines 161, 162, 163, 164, 165, 166, 167, 168 on the screen 14 and modulation signals are shown on range lines a, b, c. The higher the modulation frequency the bigger is the number of light flashes appearing on a range line 161 to 168. Thus the screen 14 provides an easily- and quickly-read modulation frequency-range display as indicated in the figure and an operator can quickly check the existance or absence of a target at a given range and easily deduce its radial velocity by counting flashes. After a little experience an operator can become quite proficient in judging the identity (i.e. type: man or men — animal — car — tank) not merely by identifying one modulation frequency of the signal but by taking advantage of the several modulation frequencies which may be deducible from the display at a given range, for example due to the tracks of a tank moving at a different speed from the tank itself. A calibrated speed control on the driving motor 11 assists in this more advanced operation.

The main advantage of this type of display is in the detection of modulation. When searching for a modulation signal eveloped in 'noise' signals the operator is looking for a regular pattern against a random background. Under these circumstances laboratory measurements have shown that a 'gain' of up to 10 dB can be realised over the simple lamp display without the rotating prism.

Of further assistance to an operator in this respect is an audio display consisting of a listening head-set 15

(FIG. 1) which may be connected to any modulation detector 61 to 6N to observe aurally when a complex modulation signal appears at a given range.

A further refinement of this system is that the frequency response of each modulation amplifier can be designed to accept only those modulation frequencies within a pre-set speed range (say 1 to 40 m.p.h.) and reject low frequency modulation due to tree foliage and other natural sources.

What I claim is:

1. A radar system comprising means for transmitting pulse signals and for receiving signals reflected from targets, a plurality of range gates each for gating a received signal corresponding to a different range, a plurality of modulation detecting means each controlled from a different range gate for detecting the modulation of signals received from a moving target and displaying the detected signal as modulations of a light source, and viewing means for viewing the light sources to give linearly displaced images thereof, whereby a moving target is displayed by that light source which corresponds to the range of the target and the number of modulations of the source along the displacement line indicates the frequency and hence the rate of radial movement of the target.

2. A radar system as claimed in claim 1, wherein the viewing means comprises an optical prism, means for rotating the prism about its longitudinal axis, the light sources being arranged in a straight line and viewed through the prism from a viewing position, and the axis of rotation of the prism being parallel to the straight line of the light sources, and a viewing screen located between the prism and the viewing position.

3. A radar system as claimed in claim 2, wherein the prism is of square cross-section.

4. A radar system as claimed in claim 2, wherein the means for rotating the prism is provided with a calibrated speed control.

5. A radar system as claimed in claim 1, wherein a sound receiver is provided for connection to any one of the modulation detecting means, whereby an aural indication of a modulation signal is obtained.

* * * * *